(12) United States Patent
Iizaka

(10) Patent No.: US 10,936,935 B2
(45) Date of Patent: Mar. 2, 2021

(54) PRODUCT TAGS AND PRODUCT SCANNING DEVICES AND METHODS

(71) Applicant: TOSHIBA TEC KABUSHIKI KAISHA, Tokyo (JP)

(72) Inventor: Hitoshi Iizaka, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 16/377,880

(22) Filed: Apr. 8, 2019

(65) Prior Publication Data
US 2019/0318144 A1 Oct. 17, 2019

(30) Foreign Application Priority Data
Apr. 12, 2018 (JP) .................... 2018-076803

(51) Int. Cl.
| | |
|---|---|
| G06K 19/18 | (2006.01) |
| G06K 7/14 | (2006.01) |
| G06K 19/06 | (2006.01) |
| G06K 19/16 | (2006.01) |
| G06K 7/10 | (2006.01) |

(52) U.S. Cl.
CPC ......... *G06K 19/18* (2013.01); *G06K 7/10722* (2013.01); *G06K 7/1404* (2013.01); *G06K 7/1413* (2013.01); *G06K 7/1434* (2013.01); *G06K 7/1439* (2013.01); *G06K 19/06046* (2013.01); *G06K 19/06065* (2013.01); *G06K 19/16* (2013.01); *G06K 2019/06215* (2013.01)

(58) Field of Classification Search
CPC ................. G06K 19/16; G06K 19/18
See application file for complete search history.

(56) References Cited

U.S. PATENT DOCUMENTS

| | | | | |
|---|---|---|---|---|
| 9,189,672 | B2* | 11/2015 | Iizaka | G06K 19/14 |
| 2003/0141375 | A1* | 7/2003 | Lawandy | G06K 19/14 |
| | | | | 235/494 |
| 2007/0170248 | A1* | 7/2007 | Brundage | G06K 19/16 |
| | | | | 235/380 |

(Continued)

FOREIGN PATENT DOCUMENTS

JP 2017194788 A 10/2017

OTHER PUBLICATIONS

Extended European Search Report dated Jul. 30, 2019, mailed in counterpart European Application No. 19168389.5, 7 pages.

*Primary Examiner* — Christle I Marshall
(74) *Attorney, Agent, or Firm* — Kim & Stewart LLP (57) ABSTRACT

A product scanner apparatus includes an image capturing device to image an object using visible light. A first reading module is configured to attempt to read a barcode symbol in a captured image from the image capturing device. The barcode symbol provides an identification of the object when read. A second reading module is configured to attempt to read digital watermark information on a product tag affixed to the object. A controller is configured to control the image capturing device to capture an image of the object, control the first reading module to read the barcode symbol, and then control the second reading module to read digital watermark information only if the barcode symbol is successfully read. The product tag includes visible text printed on a surface thereof and the digital water information encodes discount information corresponding to the visible text.

20 Claims, 9 Drawing Sheets

(56) References Cited

U.S. PATENT DOCUMENTS

| | | | |
|---|---|---|---|
| 2011/0147454 A1 | 6/2011 | Matsuhisa et al. | |
| 2011/0180596 A1 | 7/2011 | Iizaka et al. | |
| 2011/0239508 A1* | 10/2011 | Honda | G09F 3/10 |
| | | | 40/638 |
| 2012/0000980 A1* | 1/2012 | Suzuki | G07G 1/0045 |
| | | | 235/454 |
| 2012/0055994 A1* | 3/2012 | Yanagi | G07G 1/12 |
| | | | 235/454 |
| 2012/0059704 A1* | 3/2012 | Yanagi | G06Q 30/0238 |
| | | | 705/14.27 |
| 2013/0054344 A1* | 2/2013 | Iizaka | G07G 1/0054 |
| | | | 705/14.38 |
| 2013/0208946 A1* | 8/2013 | Sasaki | G06K 9/3216 |
| | | | 382/103 |
| 2014/0246487 A1 | 9/2014 | Mihara et al. | |
| 2016/0171264 A1* | 6/2016 | Mihara | G06Q 20/208 |
| | | | 235/375 |
| 2020/0117868 A1* | 4/2020 | Miyata | G06K 7/1417 |

\* cited by examiner

PRODUCT TAGS AND PRODUCT SCANNING DEVICES AND METHODS

CROSS-REFERENCE TO RELATED APPLICATION

This application is based upon and claims the benefit of priority from Japanese Patent Application No. 2018-076803, filed in Apr. 12, 2018, the entire contents of which are incorporated herein by reference.

FIELD

Embodiments described herein relate generally to product tags and code symbol reading devices and methods.

BACKGROUND

In conventional technology a barcode is affixed to a product along with a service label including discount information or the like. The barcode and the service label are imaged using an image capturing element, such as a CCD (Charge Coupled Device) image sensor, and then a commodity code for the product and the discount information from the service label are read from the captured image(s). As one example of existing art, Japanese Unexamined Patent Application Publication No. 2012-14528, discloses the registering of discount information, such as "half price", "10% discount" or the like, printed as text on a product label by reading such information in a captured image of the product. In another example, Japanese Unexamined Patent Publication No. 2017-194788, discloses a product label having a two-layer structure in which visible text indicating discount information is printed on an upper layer and encoded discount information is printed on a lower layer to be read using reflected infrared light.

However, in the code symbol reading device disclosed in Japanese Unexamined Patent Application Publication No. 2012-14528, since the discount information is merely recognized by character recognition techniques, there is a possibility that an erroneous recognition occurs due to the way the product is held in the captured image or otherwise. Also, discount information merely recorded of a label as text (letters) is easy to duplicate or manipulate, so there is a risk of fraudulent transactions.

In the code symbol reading device disclosed in Japanese Unexamined Patent Application Publication No. 2017-194788, it is necessary to use infrared light to read the encoded discount information, as such the configuration of the reading device is complicated by the need to provide a specialized light source. Furthermore, a label having the disclosed two-layer structure is not simple to manufacture as compared to a standard product label with only visible printed text.

DETAILED DESCRIPTION

In accordance with another embodiment, a product scanner apparatus comprises an image capturing device to image an object for sale at a retail location using visible light; a first reading module configured to attempt to read a barcode symbol in a captured image from the image capturing device, the barcode symbol providing an identification of the object; and a second reading module configured to attempt to read digital watermark information on a product tag affixed to the object. A controller is configured to control the image capturing device to capture an image of the object; control the first reading module to attempt to read the barcode symbol in the image of the object; and control the second reading module to attempt to read digital watermark information on the product tag only if the first reading module successfully reads the barcode symbol. The product tag includes visible discount information text printed on a surface thereof and the digital water information encodes discount information corresponding to the visible discount information text.

First Embodiment

A code symbol reading device according to a first embodiment is described below with reference to the accompanying drawings. The code symbol reading device according to the first embodiment can be used together with a POS (Point of Sale) terminal for checkout and settlement processing in a retail store or the like.

(Description of Overall Configuration of POS Terminal)

Figure 1:
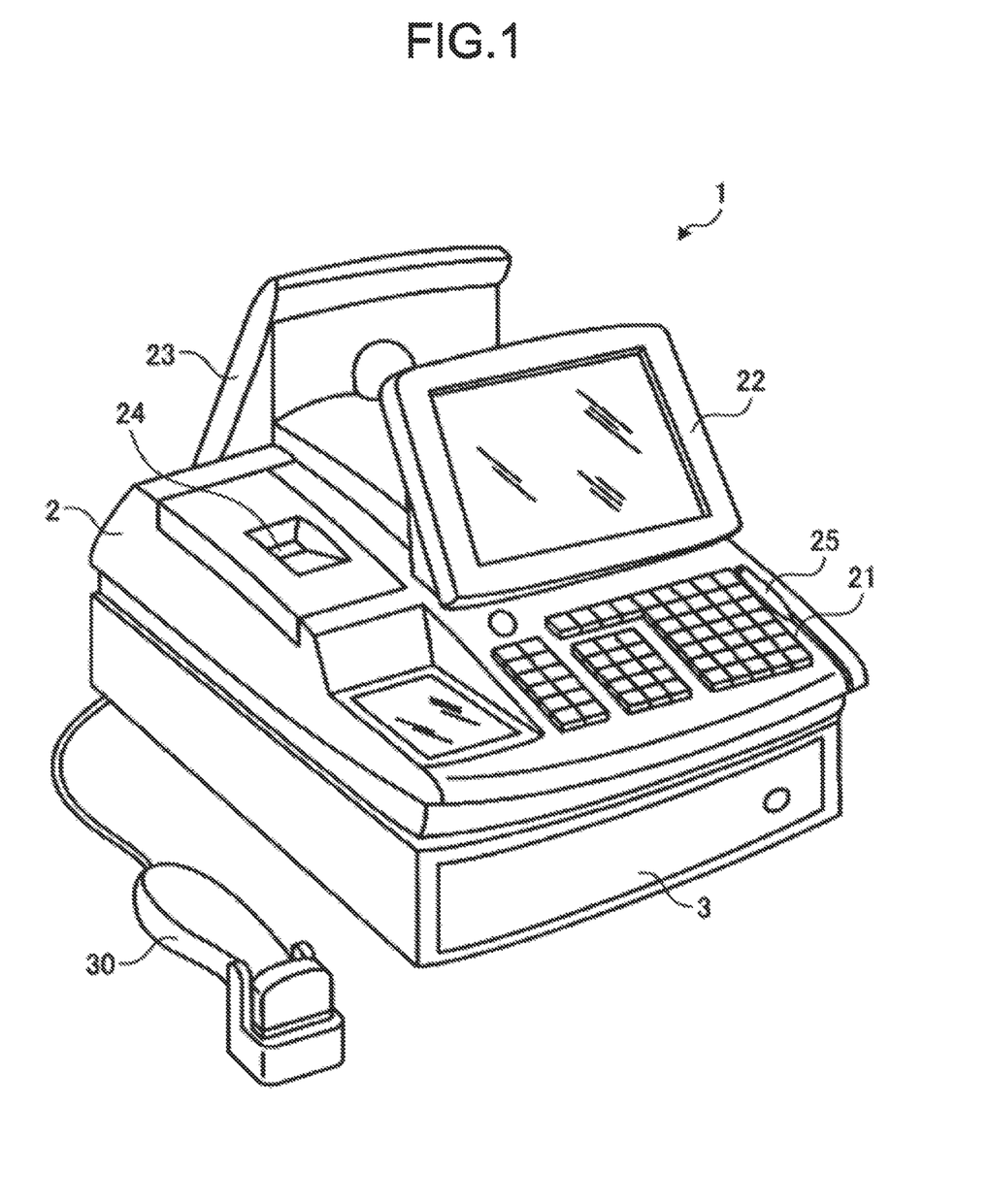
FIG. 1 is a perspective view illustrating an external appearance of a POS terminal.

FIG. 1 is a perspective view of an external appearance of a POS terminal 1. The POS terminal 1 executes registration and settlement processing on items being sold in a retail store. For registration processing, a code symbol, such as a barcode affixed to a commodity, is optically read to acquire a commodity code. A commodity name, a price, and other commodity information associated with the acquired commodity code are displayed. The acquired commodity information is stored in a RAM (Random Access Memory) or the like. In settlement processing, a total amount due in the sales transaction is displayed, a change amount due based on the amount tendered by the customer is calculated and displayed. A change machine issues the change due, and a receipt is issued.

The POS terminal 1 has a main body 2 and a cash storage box 3. The cash storage box 3 has a drawer for storing cash, coins, coupons, vouchers or the like, received from the customer and/or used to make change for the sales transaction.

The main body 2 comprises an operation section 21, an operator display section 22, a customer display section 23, a printing section 24, a card reading section 25 and a code reader 30. The operation section 21 is a keyboard including keys such as a numeric keypad for inputting numbers, a subtotal key for declaring termination of a commodity registration process and a deposit/cash total key for declaring completion of a sales transaction. The operator display section 22 is a liquid crystal display or the like and displays information to an operator, such as store clerk. The customer display section 23 is a liquid crystal display or the like, and displays information to a customer.

The printing section 24 issues a receipt by printing the commodity information and the settlement information on receipt paper drawn from a roll stored in the main body 2. The print section 24 comprises, for example, a thermal printer having a thermal transfer type print head. The card reading section 25 reads information from a card such as a credit card presented by the customer.

The code reader 30 is a hand-held type scanner. The code reader 30 reads a code symbol affixed to the commodity. The code reader 30 includes a visible light emitting section 42 (refer to FIG. 3) which emits visible light. The code reader 30 is not necessarily limited to a hand-held type. For example, the code reader 30 may be a so-called vertical scanner which includes an image capturing window along the height direction of a display mount or the like for a POS terminal. With a vertical scanner arrangement, the operator reads the code symbol affixed to the commodity by manually holding the commodity up to the image capturing window or the like. The code reader 30 is an example of a code symbol reading device.

Figure 3:
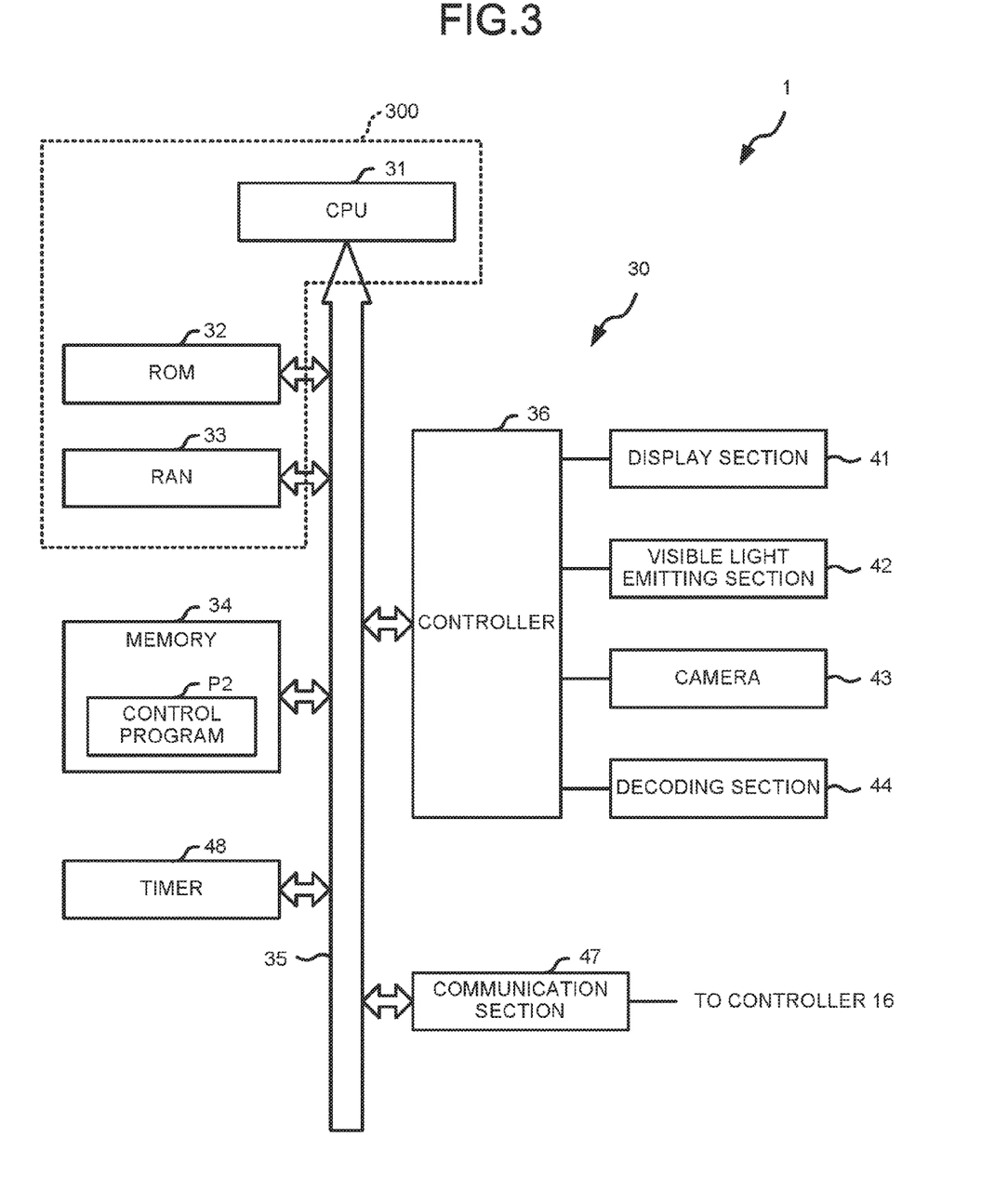
FIG. 3 is a block diagram schematically illustrating a hardware configuration of a code reader.

The code reader 30 includes a camera 43 (refer to FIG. 3). The camera 43 has a light receiving sensor composed of a CCD (Charge Coupled Device) or a CMOS (Complementary Metal Oxide Semiconductor). For example, the camera 43 receives light within a visible light range, which here is considered from 380 nm to 780 nm, to capture an image.

The code reader 30 extracts an image of the code symbol, which may be a barcode or other two-dimensional code, affixed to the commodity from the captured image. Then, the code reader 30 reads the code information from the extracted image of the code symbol.

The code reader 30 recognizes coded information, such as a digital watermark, in the captured image of the commodity. Then, the code reader 30 decodes the coded information.

The code reader 30 includes a decoding section 44 (refer to FIG. 3). The decoding section 44 decodes a code symbol, such as a barcode, a digital watermark or the like into digital information and generates decoded information.

(Description of Hardware Configuration of POS Terminal)

Figure 2:
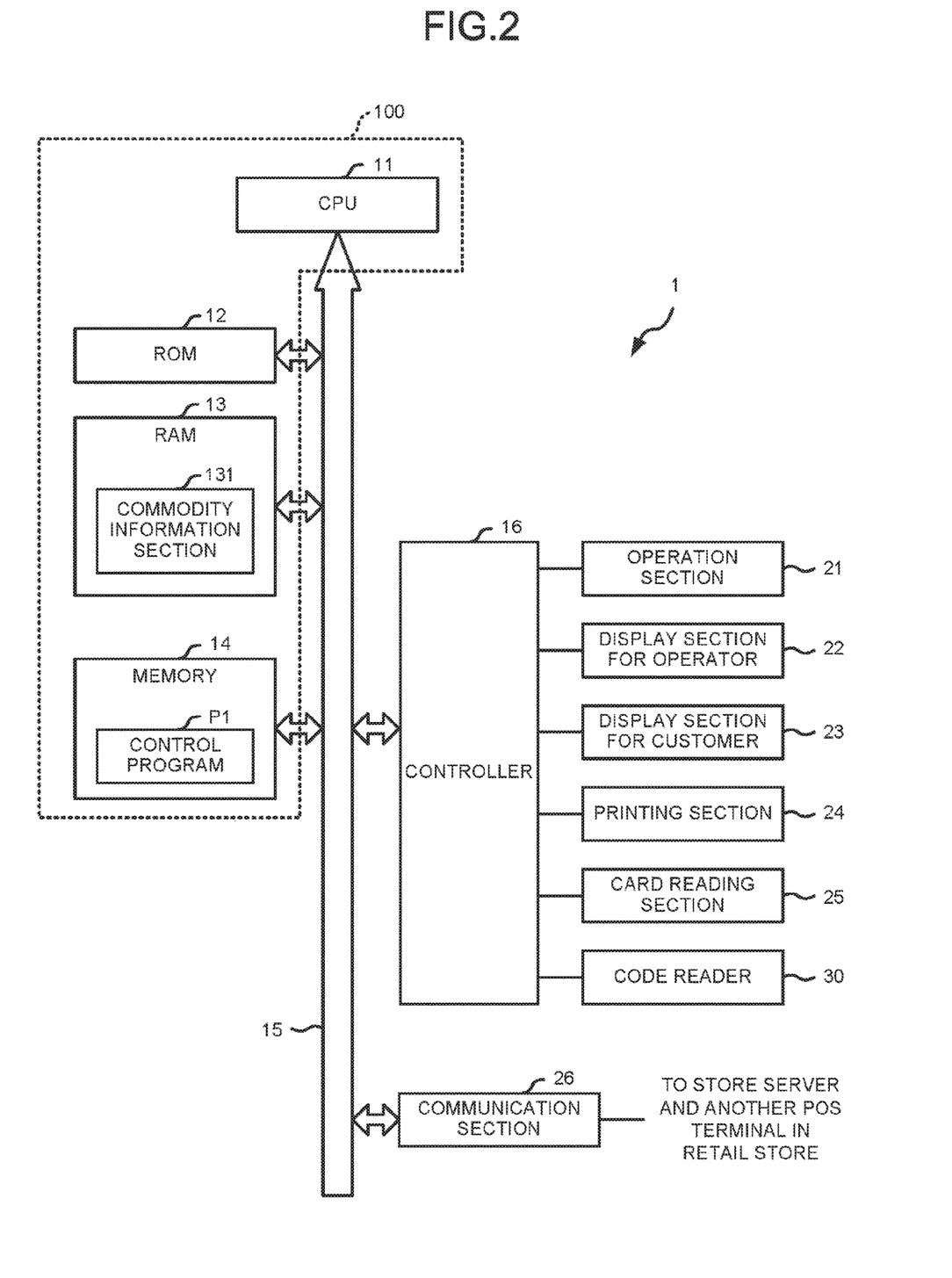
FIG. 2 is a block diagram schematically illustrating a hardware configuration of a POS terminal of a first embodiment.

Next, the hardware configuration of the POS terminal 1 is described. FIG. 2 is a hardware block diagram illustrating an example of a hardware configuration of the POS terminal 1. As shown in FIG. 2, the POS terminal 1 includes a CPU (Central Processing Unit) 11, a ROM (Read Only Memory) 12, a RAM (Random Access Memory) 13, a memory device 14, and the like. The CPU 11 is a main control portion. The ROM 12 stores various kinds of fixed data, various tables, and the like. The RAM 13 functions as a work memory in which control programs and various kinds of data can be copied or loaded when the CPU 11 performs various processing. The memory device 14 stores a control program P1 to be executed by the CPU 11. The CPU 11, the ROM 12, the RAM 13, and the memory device 14 are connected to each other via a bus 15. The CPU 11, the ROM 12 and the RAM 13 together constitute a control section 100, also referred to as a control unit. Specifically, the CPU 11 loads the control program P1 from the memory device 14 along with various kinds of data from the ROM 12 on the RAM 13, and in this way, the control section 100 executes various control processing according to the instructions of control program P1.

The RAM 13 has a commodity information section 131. The commodity information section 131 temporarily stores the commodity information (e.g., commodity name, commodity price, etc.) of the commodity for which the registration processing is being performed based on the commodity code acquired from the code symbol read by the code reader 30.

The memory device 14 is a nonvolatile memory such as an HDD (Hard Disk Drive) or a flash memory that stores storage information even when a power supply thereof is turned off, and stores the control program P1 to be executed by the control section 100.

The control section 100 is connected, via the bus 15 and a controller 16, to peripheral devices including the operation section 21, the operator display section 22, the customer display section 23, the printing section 24, the card reading section 25, and the code reader 30. The controller 16 receives an instruction from the control section 100 to control an operation of these peripheral devices.

The control section 100 is connected to a communication section 26 via the bus 15. The communication section 26 is an interface for connecting to other POS terminals 1 installed in the retail store and/or a store server via a network connection. In general, each POS terminal 1 installed in the retail store is connected to the store server via a network. The store server collects commodity information and the settlement information from each POS terminal 1. The store server may operate to transmit the collected commodity and settlement information to a headquarters server for managing information for a plurality of retail stores.

(Description of Hardware Configuration of Code Reader)

Next, the hardware configuration of the code reader 30 is described. FIG. 3 is a hardware block diagram illustrating an example of a hardware configuration of the code reader 30. As shown in FIG. 3, the code reader 30 includes a CPU 31, a ROM 32, a RAM 33, a memory unit 34, and the like. The CPU 31 is a main control portion. The ROM 32 stores various kinds of fixed data, various tables, and the like. The RAM 33 functions as a work memory in which control programs and various kinds of data are loaded when the CPU 31 performs various processing. The memory unit 34 stores a control program P2 to be executed by the CPU 31. The CPU 31, the ROM 32, the RAM 33, and the memory unit 34 are connected to each other via a bus 35. The CPU 31, the ROM 32 and the RAM 33 constitute a control section 300. Specifically, the CPU 31 operates by loading the control program P2 the memory unit 34 along with various data stored in the ROM 32 on the RAM 33, and in this way, the control section 300 executes various control processing according to the instructions of the control program P2.

The memory unit 34 is a nonvolatile memory such as an HDD (Hard Disk Drive) or a flash memory that stores storage information even when a power supply thereof is turned off, and stores the control program P2 to be executed by the control section 300.

The control section 300 is connected to peripheral devices including a display section 41, a visible light emitting section 42, the camera 43, and the decoding section 44 via the bus 35 and a controller 36. The controller 36 receives instructions from the control section 300 and controls the operation of these peripheral devices.

The display section 41 displays the reading results from the code reader 30 for an operator of the POS terminal 1.

The visible light emitting section 42 is, for example, a white LED (Light Emitting Diode) and emits visible light.

Figure 4:
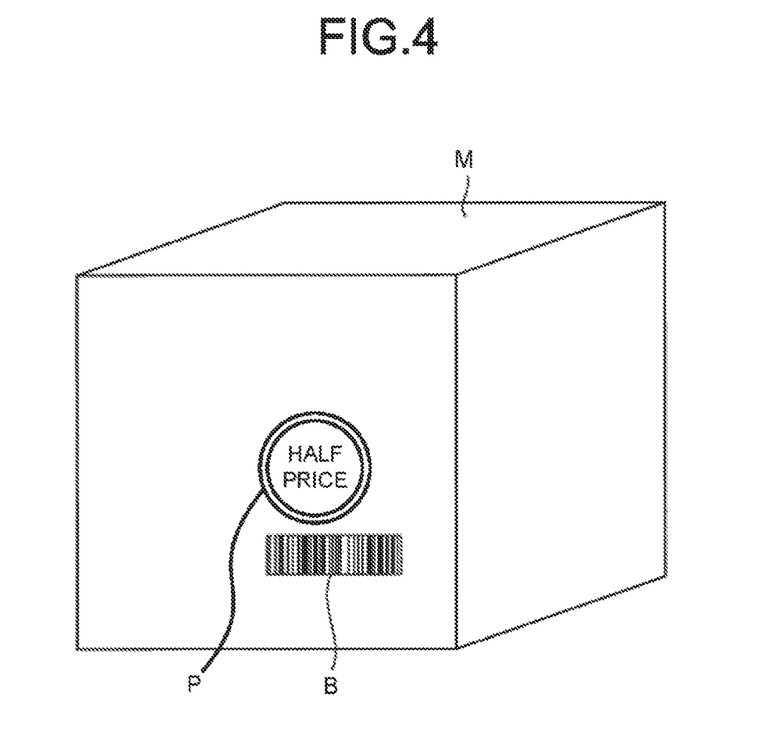
FIG. 4 depicts an external appearance of a commodity.

The camera 43 captures an image of a commodity M (see FIG. 4). As described above, the decoding section 44 decodes the coded information included in the code symbol in the image captured by the camera 43.

The control section 300 is connected to a communication section 47 and a timer 48 via the bus 35. The communication section 47 is connected to the controller 16 (refer to FIG. 2) via a communication line. The timer 48 functions to count elapsed time. The timer 48 may be provided in the CPU 31 or by an operation of the CPU 31.

(Description of Code Symbol Affixed to Commodity)

Figure 5:
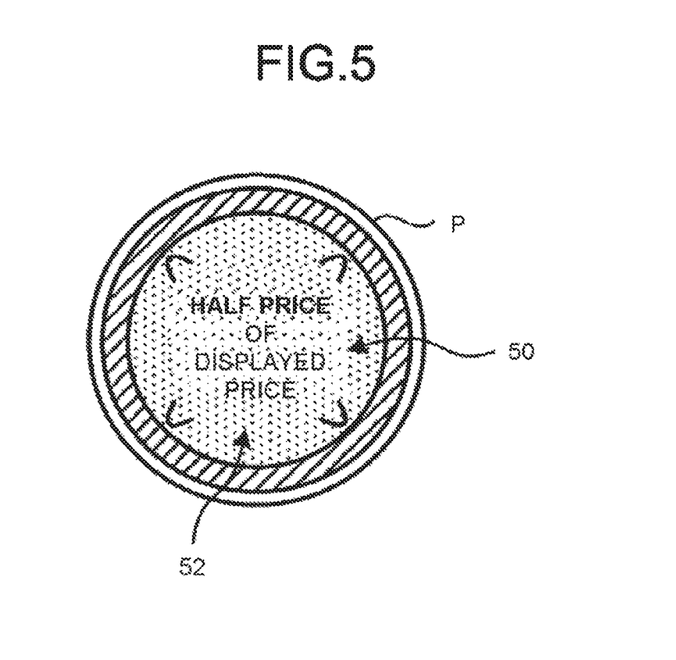
FIG. 5 depicts a structure of a discount sticker affixed to the commodity.

Next, with reference to FIG. 4 and FIG. 5, a code symbol that is affixed to a commodity to be read by the code reader 30 is described. FIG. 4 is a diagram illustrating an example of an appearance of the commodity M. FIG. 5 is a diagram illustrating a structure of a discount sticker P affixed to the commodity M. As shown in FIG. 4, the discount sticker P including encoded discount information for the commodity M and a barcode B providing a commodity code for the commodity M are on an outer surface of the commodity M. Here, commodity M is a product, object, or item being sold in the retail store. The barcode B and the discount sticker P are affixed to commodity M at positions close to each other.

The discount sticker P contains discount information related to the commodity M as shown in FIG. 5. The discount information of discount sticker P comprises visible information 50 and invisible information 52. The visible information 50 is useful to a customer or a store clerk to confirm contents of the discount sticker P. The visible information 50 is, for example, text such as "half price", "reduced by 20 Yen", "30% discount" or the like. The discount sticker P is an example of a product tag.

The invisible information 52 can be read by the code reader 30. The invisible information 52 is obtained by encoding information having substantially the same meaning as the visible information 50. The invisible information 52 is printed on the surface of the discount sticker P. The invisible information 52 is, for example, a set of encoded dots and generally cannot be visually noticed and/or interpreted by a customer or store clerk. Strictly speaking, the invisible information 52 in some examples may be visible to the unaided human eye; however, this "invisible" information may be presented in a manner that is not easily noticeable or recognizable as related to encoded information. The invisible information 52 can be a type of digital watermark used for embedding electronically generated information in an image. The invisible information 52 is an example of a first code symbol. At least some invisible information 52 is printed on the surface of the discount sticker P. The same invisible information 52 may be printed repeatedly on the surface of the discount sticker P. A well-known technology can be used to embed the encoded information as a digital watermark, and thus the detailed description of this technique is omitted.

The barcode B includes a commodity code (e.g., a JAN (Japan Article Number) code) for specifying commodity M. The barcode B is an example of a second code symbol. Instead of the barcode B, a two-dimensional code such as QR Code® may be affixed.

Since the barcode B and the discount sticker P are affixed to positions close to each other, both the barcode B and the discount sticker P will generally be contained in the image of the commodity M captured by the camera 43.

(Description of Functional Components of Code Reader)

Figure 6:
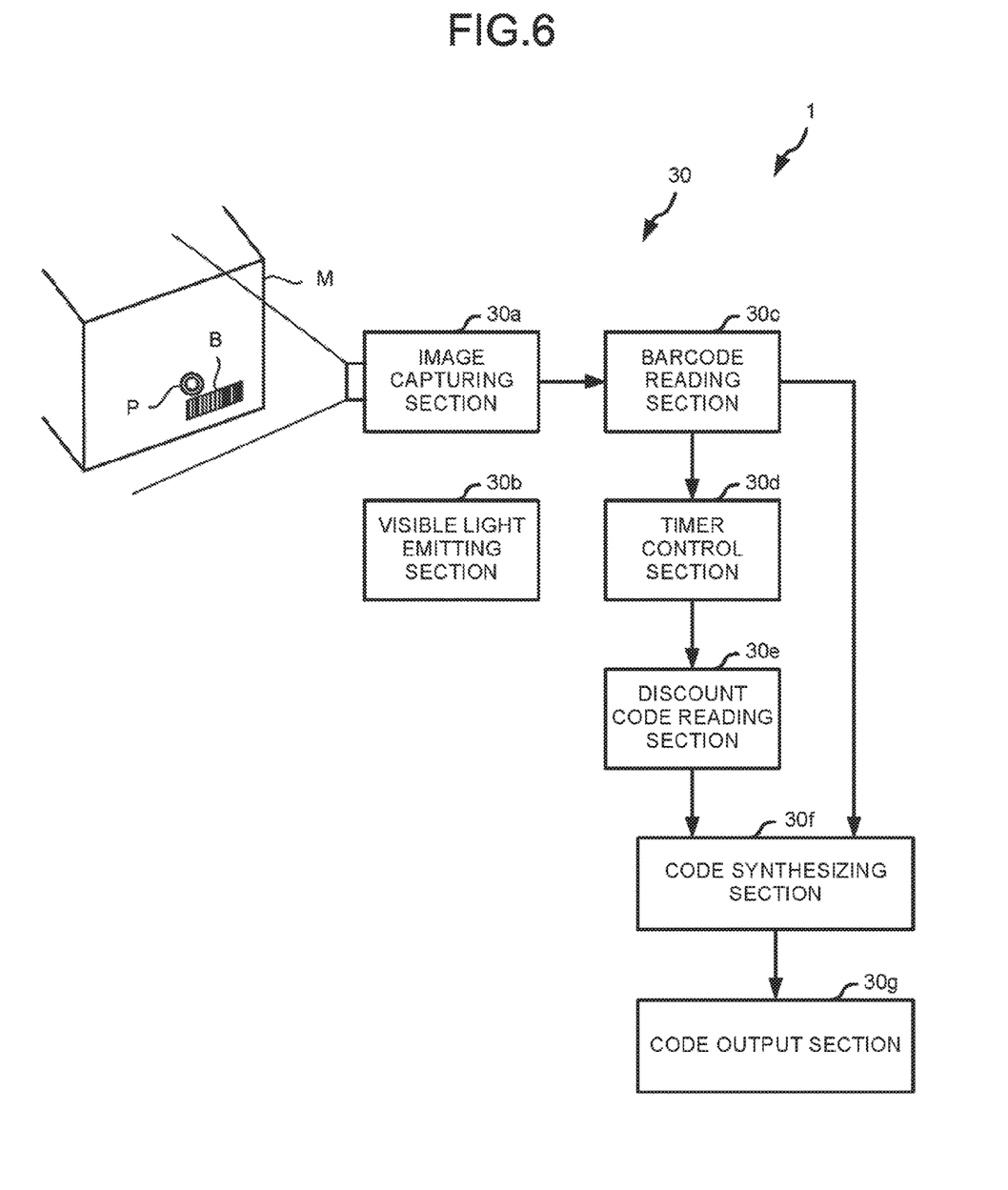
FIG. 6 is a block diagram schematically illustrating functional components of a code reader.

Next, the functional components of the code reader 30 are described with reference to FIG. 6. FIG. 6 is a functional block diagram illustrating an example of functional components of the code reader 30.

The control section 300 (refer to FIG. 3) of the code reader 30 executes the control program P2 to function as an image capturing section 30a, a visible light emitting section 30b, a barcode reading section 30c, a timer control section 30d, a discount code reading section 30e, a code synthesizing section 30f, and a code output section 30g as shown in FIG. 6.

The image capturing section 30a captures an image of the commodity M being purchased by the customer, The commodity M has the barcode B and the discount sticker P thereon. The image capturing section 30a includes the camera 43 described above (refer to FIG. 3). The image capturing section 30a is an example of an image capturing module.

The visible light emitting section 30b controls the visible light emitting section 42 (refer to FIG. 3) to emit visible light towards the barcode B and the discount sticker P of the commodity M.

The barcode reading section 30c searches the image captured by the image capturing section 30a for the barcode B (second code symbol). When the barcode B is found, the barcode reading section 30c decodes the barcode B to extract a commodity code. The barcode reading section 30c is an example of a first reading module.

The timer control section 30d sets a period of time during which there is a search the discount sticker P after the barcode reading section 30c has found the barcode B and decoded the barcode B. Specifically, if the discount sticker P cannot be found within the period of time set by the timer control section 30d, the code reader 30 determines that a discount sticker P has not been affixed to the commodity M.

If the discount sticker P is found in the captured image within the allotted time, the discount code reading section 30e reads the invisible information 52 (first code symbol) printed on the discount sticker P. The discount code reading section 30e is an example of a second reading module.

The code synthesizing section 30f combines the commodity code read from the barcode B and the discount information read from the discount sticker P to obtain a synthesized code. The format of the synthesized code is essentially arbitrary, but the synthesized code includes at least the commodity code read from the barcode B and the discount information from the discount sticker P in some manner. The code synthesizing section 30f is an example of a synthesizing module. In this manner, by synthesizing the commodity code and the discount information of the commodity M into a single code format, data transmission and reception and data processing can be performed more efficiently.

The code output section 30g outputs the synthesized code information from the code synthesizing section 30f to the control section 100 (refer to FIG. 2) of the POS terminal 1.

(Description of Flow of Processing Performed by POS Terminal)

Figure 7:
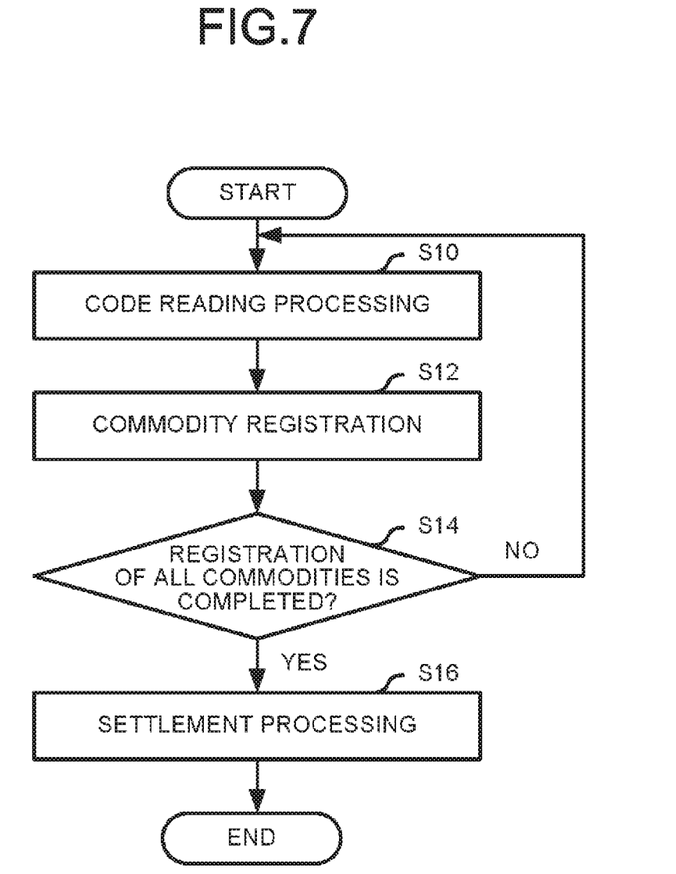
FIG. 7 is a flowchart of processing performed by a POS terminal.

Next, a flow of a processing performed by the POS terminal 1 in a first embodiment is described. FIG. 7 is a flowchart depicting an example of a flow of a processing performed by the POS terminal 1.

The control section 100 of the POS terminal 1 controls the code reader 30 to execute a code reading by capturing an image of the commodity M including the barcode B and the discount sticker P and extracting the coded information from the captured image (Act S10).

The control section 100 registers the coded information as read by the code reader 30 in the commodity information section 131 (refer to FIG. 2) (Act S12).

The control section 100 determines whether registration of all commodities has been completed (Act S14). Specifically, the control section 100 determines that registration is completed when a subtotal key for declaring termination of the commodity registration in the operation section 21 is pressed. If it is determined that registration is completed (Yes in Act S14), the flow proceeds to the processing in Act S16. On the other hand, if it is determined that registration is not completed (No in Act S14), the flow returns to the processing in Act S10 to read a code from the next commodity.

The control section 100 next performs the settlement processing (Act S16). Thereafter, the POS terminal 1 terminates processing.

(Description of Flow of Processing Performed by Code Reader)

Figure 8:
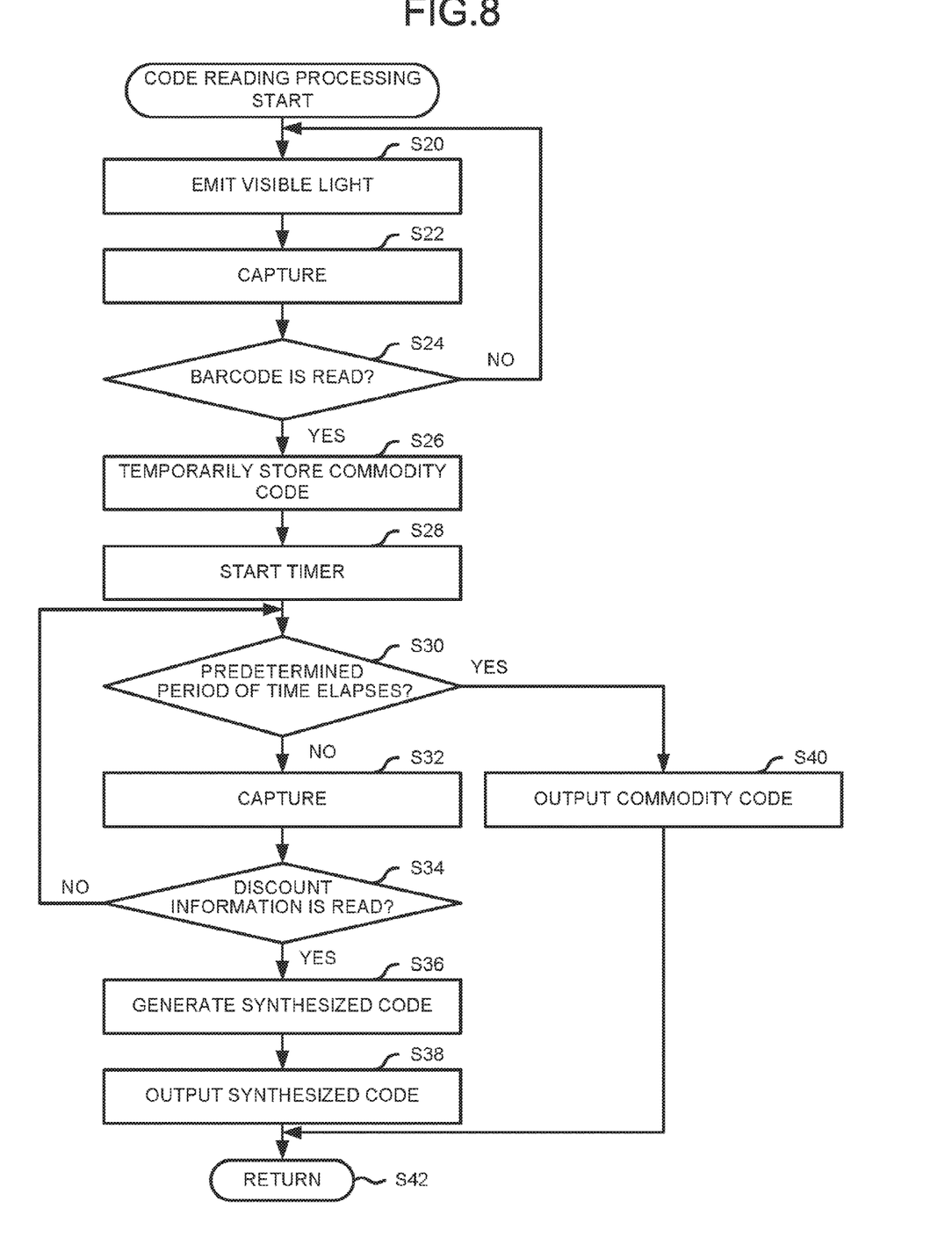
FIG. 8 is a flowchart depicting aspects of a code reading processing performed by a code reader.

Next, a flow of the code reading processing performed by the code reader 30 in Act S10 in FIG. 7 is described with reference to FIG. 8. FIG. 8 is a flowchart depicting an example of a flow of the code reading processing performed by the code reader 30.

The visible light emitting section 30b controls the visible light emitting section 42 to emit visible light (Act S20).

The image capturing section 30a controls the camera 43 to capture an image of the commodity M (Act S22).

The barcode reading section 30c processes the image captured by the image capturing section 30a and determines whether the barcode B is read (Act S24). If it is determined that the barcode B is read (Yes in Act S24), the flow proceeds to the processing in Act S26. On the other hand, if it is determined that a barcode B is not read (No in Act S24), the flow returns to the processing in Act S20.

If Yes is determined in Act S24, the barcode reading section 30c temporarily stores the commodity code of the commodity M read from the barcode B in the RAM 33 in Act S26.

The timer control section 30d starts the timer 48 (Act S28). Then, the timer control section 30d determines whether a preset predetermined period of time has elapsed by monitoring the timer 48 (Act S30). If it is determined that the preset predetermined period of time has elapsed (Yes in Act S30), the flow proceeds to the processing in Act S40. On the other hand, if it is determined that the preset predetermined period of time has not elapsed (No in Act S30), the flow proceeds to the processing in Act S32.

If Yes is determined in Act S30, the barcode reading section 30c reads out the commodity code temporarily stored in the RAM 33 and transmits the commodity code to the code output section 30g via the code synthesizing section 30f in Act S40. Thereafter, the process returns to the flowchart in FIG. 7 (Act S42).

If No is determined in Act S30, the image capturing section 30a controls the camera 43 to capture another image of the commodity M in Act S32.

The discount code reading section 30e processes the image captured by the image capturing section 30a and determines whether a discount sticker P has been read (Act S34). If it is determined that a discount sticker P has been read (Yes in Act S34), the flow proceeds to the processing in Act S36. On the other hand, if it is determined that the discount sticker P has not been read (No in Act S34), the flow returns to the processing in Act S30.

Since the barcode B and the discount sticker P are typically affixed at positions close to each other, the image of the commodity M captured by the camera 43 generally includes both the barcode B and the discount sticker P. However, since the operator of the code reader 30 may use the code reader 30 by manually positioning it over the commodity M, there are cases in which potentially only the barcode B is in the image and the discount sticker P is not even though it has been affixed to the commodity M. In this case, No is determined in Act S34. Therefore, if No is determined in Act S34, the flow returns to the processing in Act S30, and the image capturing operation is repeated until a predetermined period of time passes. During this period of time, the operator of the code reader 30 can change a position of the code reader 30 relative to the commodity M so that the discount sticker P can be imaged.

If Yes is determined in Act S34, the code synthesizing section 30f synthesizes the commodity code read from the barcode B and the discount information read from the discount sticker P to generate a synthesized code in Act S36.

Subsequently, the code output section 30g outputs the synthesized code (Act S38). If no discount sticker P has been affixed to the commodity M, then only the commodity code will be output in Act S40, but the lone commodity code output in Act S40 also has a format corresponding to that of the synthesized code generated in Act S36 and output in Act S38, but with a portion thereof indicating blank or null discount information for the commodity M.

Thereafter, the code reading processing performed by the code reader 30 is terminated, and the flow returns to the flowchart in FIG. 7 (Act S42).

Second Embodiment

Next, a code symbol reading device according to a second embodiment is described with reference to the accompanying drawings. The code symbol reading device according to the second embodiment is used together with a POS terminal 1a (see FIG. 9) that performs checkout and settlement processing in a store such as a retail store. The POS terminal 1a has substantially the same hardware configuration as that of the POS terminal 1 described in the first embodiment, but includes a code reader (refer to FIG. 9) instead of the code reader 30 (refer to FIG. 6). The function of the POS terminal 1a is the same as that of the POS terminal 1. Those hardware components and functional components of the POS terminal 1a that are the same as those of the POS terminal 1 are denoted with the same reference numerals.

(Description of Functional Components of Code Reader of Second Embodiment)

Figure 9:
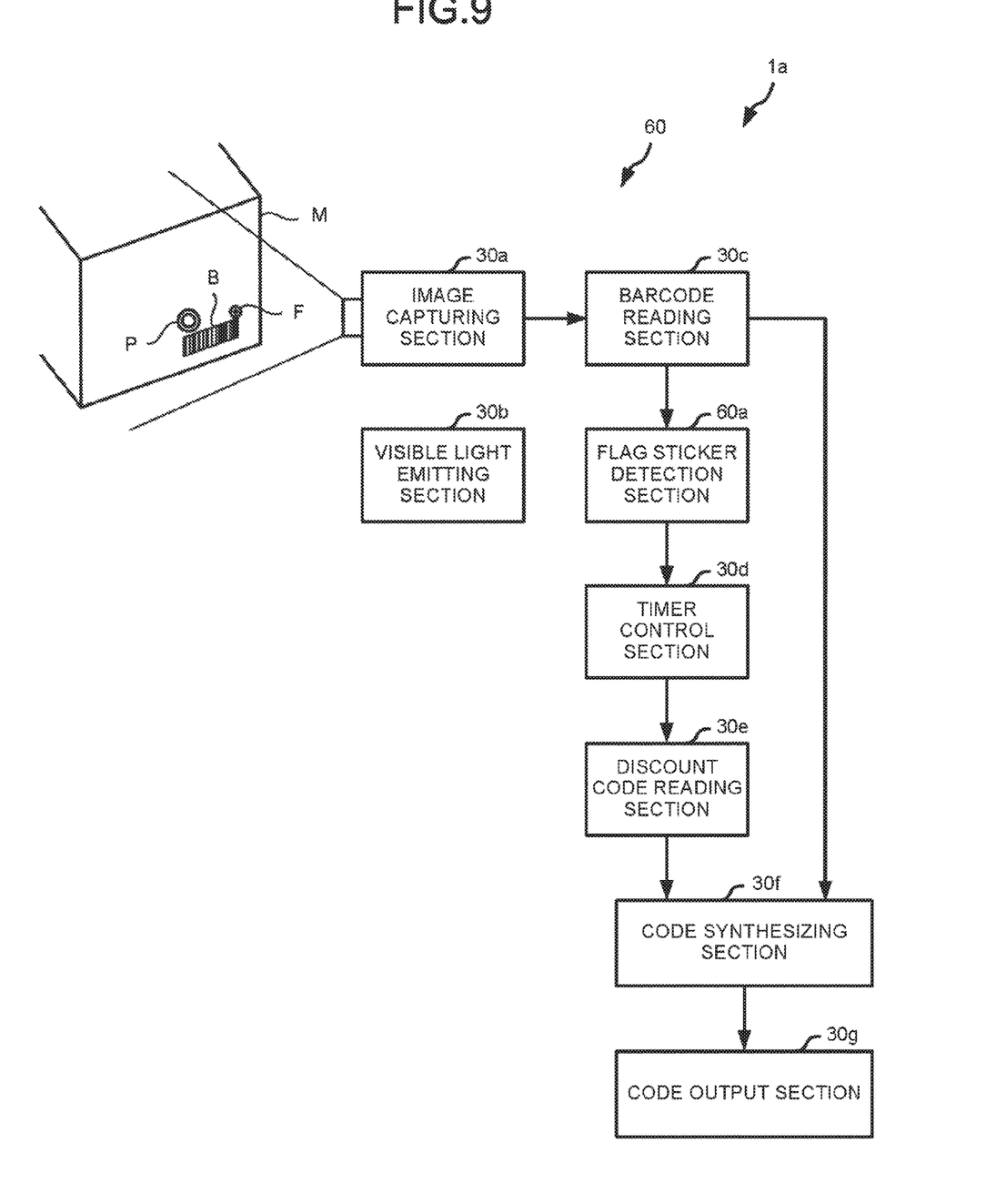
FIG. 9 is a block diagram schematically illustrating functional components of a code reader in a POS terminal of a second embodiment.

With reference to FIG. 9, the function of the code reader 60 of the POS terminal 1a is described. FIG. 9 is a functional block diagram illustrating an example of functional components of the code reader included in the POS terminal 1a according to the second embodiment.

The code reader 60 has a flag sticker detection section 60a in addition to the various functional components of the code reader 30. The flag sticker detection section 60a detects a flag sticker F that has been affixed to the commodity M in the image of the commodity M captured by the image capturing section 30a. The code reader 60 is an example of a code symbol reading device.

As shown in FIG. 9, the flag sticker F is affixed to the commodity M in the vicinity of the barcode B. The flag sticker F indicates that a discount sticker P has been affixed to the commodity M at some place. Specifically, the flag sticker F has a specific, predetermined shape, such as a double circle, a triangle, an ellipse, or the like. The flag sticker detection section 60a detects the flag sticker F by carrying out an image processing for detecting this shape in the image of the commodity M captured by the image capturing section 30a.

For a commodity being sold without any discount the code reader 30 will attempt to detect a discount sticker P in the image captured by the camera 43 regardless of whether or not the discount sticker P has been placed on the commodity. As such, the code reader 30 will attempt to find the discount sticker P until the predetermined period of time elapse. Therefore, even for those commodities M to which no discount sticker P have been affixed, processing time for each item will be at least equal to the predetermined period of time set for the discount sticker P search.

In contrast, the code reader 60 included in the POS terminal 1a according to the second embodiment attempts to detect the discount sticker P only if the flag sticker F is detected. Since detection of the flag sticker F is simpler, a shorter time is required as compared with the case in which the discount sticker P must be detected. Therefore, according to the code reader 60, the processing time for those commodities for which no discount sticker P has been affixed can be shortened.

(Description of Flow of Processing Performed by Code Reader of Second Embodiment)

Figure 10:
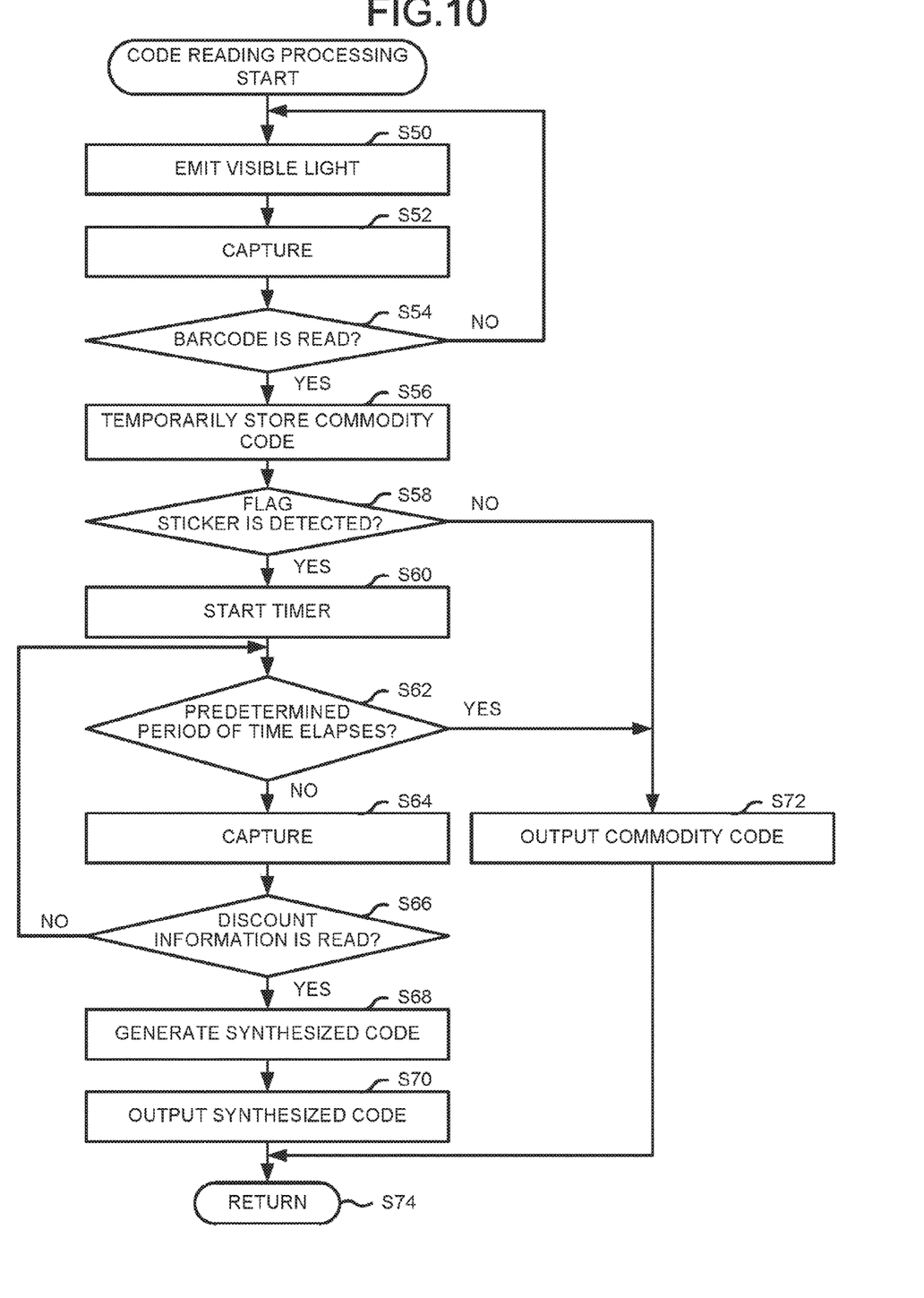
FIG. 10 is a flowchart depicting aspects of a code reading processing performed by a code reader according to a second embodiment.

A flow of a code reading processing performed by the code reader 60 is described with reference to FIG. 10. FIG. 10 is a flowchart depicting an example of a flow of the code reading processing performed by the code reader 60 according to the second embodiment.

The processing from Act S50 to Act S56 is substantially equivalent to that from Act S20 to Act S26 described with reference to FIG. 8.

In Act S58, the flag sticker detection section 60a detects the flag sticker F in the image of the commodity M captured by the image capturing section 30a. Then, if the flag sticker detection section 60a determines that the flag sticker F has been detected (Yes in Act S58), the flow proceeds to the processing in Act S60. On the other hand, if it is determined that the flag sticker F has not been detected (No in Act S58), the flow proceeds to the processing in Act S72.

If Yes is determined in Act S58, the processing subsequent to Act S60 (Acts S60, S62, S64, S66, S68, S70 and S74) which is performed subsequently is substantially equivalent to those subsequent to Act S28 (Acts S28, S30, S32, S34, S36, S38 and S42).

If No is determined in Act S58, the processing in Acts S72 and S74 which is performed subsequently is substantially equivalent to that in Acts S40 and S42 described for FIG. 8.

As described above, a discount sticker P of a particular type is affixed to a commodity M or other object. On the discount sticker P, information (e.g., discount information) relating to the commodity M and the invisible information 52, which can be read using visible light, is recorded. Therefore, it is possible to read all information on the discount sticker P using visible light, and it is possible to prevent fraudulent discount information that might result from counterfeiting or the like of standard discount stickers.

In the discount sticker P of an example, the invisible information 52 is a digital watermark. Such a digital watermark may be difficult to counterfeit, and the information incorporated within the digital watermark may be protectively encoded.

In the code reader 30, the image capturing section 30a captures an image of a commodity M (or other object) and the discount sticker P using visible light. The barcode reading section 30c reads the barcode B (including the information for identifying the commodity M (or other object). If the barcode reading section 30c reads the barcode B, the discount code reading section 30e attempts to read the invisible information 52 recorded on discount sticker P from the image. The invisible information 52 can, in fact, be read using visible light. However, since the invisible information 52 is encoded, it is possible to prevent counterfeiting or the like, and it is also possible to improve reading accuracy of the discount information as compared to manual entry by the operator or optical character recognition.

In the code reader 30, the image capturing section 30a can typically capture the invisible information 52 and the barcode B in the same image. Therefore, the invisible information 52 can be easily and reliably detected.

In the code reader 30, the code synthesizing section 30f synthesizes the reading result of the barcode reading section 30c and the reading result of the discount code reading section 30e. Therefore, it is possible to combine two different codes into one and can handle it as a single format coded data. Thus, it is possible to efficiently transmit and receive the coded data.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

The control programs P1 and P2 be stored in the memory device 14 or the memory unit 34, or may be recorded in a non-transistor computer-readable recording medium such as a CD-ROM (compact disc read-only memory), a FD (Flexible Disk), a CD-R (Compact Disc Rewritable), a DVD (Digital Versatile Disk) and the like in the form of installable or executable file. The control programs P1 and P2 may be stored in a computer connected to a network and downloaded via the network. The control programs P1 and P2 may be distributed via a network such as the Internet.

What is claimed is:

1. A product scanner apparatus, comprising:
an image capturing device to image an object for sale at a retail location using visible light;
a first reading module configured to attempt to read a barcode symbol in a captured image from the image capturing device, the barcode symbol providing an identification of the object;
a second reading module configured to attempt to read digital watermark information on a product tag affixed to the object; and
a controller configured to:
control the image capturing device to capture an image of the object;
control the first reading module to attempt to read the barcode symbol in the image of the object; and
control the second reading module to attempt to read digital watermark information on the product tag only if the first reading module successfully reads the barcode symbol, wherein
the product tag includes visible discount information text printed on a surface thereof and the digital watermark information encodes discount information corresponding to the visible discount information text.

2. The product scanner apparatus according to claim 1, wherein the first and second reading modules use the same image from the image capturing device.

3. The product scanner apparatus according to claim 1, further comprising:
a timer, wherein
the controller is configured to use the timer to limit the attempt of the second reading module to read the digital watermark information to a fixed length time period after the barcode symbol is successfully read.

4. The product scanner apparatus according to claim 1, further comprising:
a visible light emitting element, wherein
the controller is further configured to control the visible light emitting element to emit visible light in conjunction with the capturing of images with the image capturing device.

5. The product scanner apparatus according to claim 1, wherein the controller is further configured to control the second reading module to attempt to read the digital watermark information only if both the barcode symbol is successfully read and a flag symbol adjacent to the barcode symbol on the object is detected by the first reading module.

6. The product scanner apparatus according to claim 5, wherein the controller is further configured to:
combine the identification of the object corresponding to the barcode symbol read by the first reading module and the discount information encoded in the digital watermark information into a synthesized code, and
output the synthesized code to a register apparatus.

7. The product scanner apparatus according to claim 6, further comprising:
a timer, wherein
the controller is configured to use the timer to limit the attempt of the second reading module to read the digital watermark information to a fixed length time period after the barcode symbol is successfully read and the flag symbol detected.

8. The product scanner apparatus according to claim 5, further comprising:
a timer, wherein
the controller is configured to use the timer to limit the attempt of the second reading module to read the digital watermark information to a fixed length time period after the barcode symbol is successfully read and the flag symbol detected.

9. The product scanner apparatus according to claim 1, wherein the controller is further configured to:
combine the identification of the object corresponding to the barcode symbol read by the first reading module and the discount information encoded in the digital watermark information into a synthesized code, and
output the synthesized code to a register apparatus.

10. The product scanner apparatus according to claim 9, further comprising:
a timer, wherein
the controller is configured to use the timer to limit the attempt of the second reading module to read the digital watermark information to a fixed length time period after the barcode symbol is successfully read.

11. A method of scanning products for retail sales transactions, comprising:
capturing an image of an object for sale at a retail location using visible light;
attempting to read a barcode symbol in the captured image from the image capturing device, the barcode symbol providing an identification of the object when read; and
attempting to read digital watermark information on a product tag affixed to the object only if the barcode symbol is successfully read, wherein
the product tag includes visible discount information text printed on a surface thereof and the digital watermark information encodes discount information corresponding to the visible discount information text.

12. The method according to claim 11, wherein the product tag and the barcode symbol are read from the same captured image.

13. The method according to claim 11, wherein the attempting to read the digital watermark information is limited to a fixed length period after the barcode symbol is successfully read.

14. The method according to claim 13, further comprising:
combining the identification of the object corresponding to the barcode symbol and the discount information encoded in the digital watermark information into a synthesized code; and
outputting the synthesized code to a register apparatus.

15. The method according to claim 11, further comprising:
attempting to identify a flag symbol adjacent to the barcode symbol on the object, wherein
the attempting to read the digital watermark information is performed only if both the barcode symbol is successfully read and the flag symbol is detected.

16. The method according to claim 15, wherein the attempting to read the digital watermark information is limited to a fixed length period after the barcode symbol is successfully read and the flag symbol is detected.

17. The method according to claim 16, further comprising:
combining the identification of the object corresponding to the barcode symbol and the discount information encoded in the digital watermark information into a synthesized code; and
outputting the synthesized code to a register apparatus.

18. The method according to claim 11, further comprising:
combining the identification of the object corresponding to the barcode symbol and the discount information encoded in the digital watermark information into a synthesized code; and
outputting the synthesized code to a register apparatus.

19. A product tag to be affixed to an item for sale at a retail location, comprising:
visible discount information text on a surface of the product tag; and
encoded discount information corresponding to the visible discount information text, the encoded discount information being a digital watermark disposed on the surface of the product tag and readable by a product scanner apparatus using visible light.

20. A discounted item for sale at a retail location, comprising:
a product having a barcode symbol thereon for identifying the product; and
a product tag according to claim 19 affixed thereon.

* * * * *